United States Patent [19]
Kian

[11] Patent Number: 5,154,115
[45] Date of Patent: Oct. 13, 1992

[54] PIZZA CRUST COOKING UTENSIL

[76] Inventor: Leonard Kian, 1018 Alger, S.E., Grand Rapids, Mich. 49507

[21] Appl. No.: 780,028

[22] Filed: Oct. 21, 1991

Related U.S. Application Data

[63] Continuation of Ser. No. 530,608, May 30, 1990, abandoned.

[51] Int. Cl.⁵ ............................................ A47J 36/20
[52] U.S. Cl. .................................. 99/380; 99/372; 99/432
[58] Field of Search ................ 99/349, 383, 376, 375, 99/380, 422, 426, 432, 445, 447

[56] References Cited

U.S. PATENT DOCUMENTS

| | | | |
|---|---|---|---|
| D. 234,233 | 2/1975 | Silvestri | 426/549 X |
| 264,867 | 9/1882 | Ege | 99/375 |
| 1,783,798 | 12/1930 | Kohr | 99/383 |
| 2,198,647 | 4/1940 | Wolcott | 99/422 |
| 2,556,892 | 6/1951 | Young | 99/383 |
| 2,803,034 | 8/1957 | Fleming | 99/380 |
| 2,899,888 | 8/1959 | Koci | 99/376 |
| 3,469,525 | 9/1969 | Trozzolo | 99/445 |
| 3,490,358 | 1/1970 | Bardeau et al. | 99/380 |
| 3,719,507 | 3/1971 | Bardeau | 99/375 |
| 3,814,005 | 6/1974 | Widdel | 99/349 |
| 3,987,719 | 10/1976 | Kian | 99/422 |
| 4,093,749 | 6/1978 | Sternberg | 426/549 X |
| 4,285,979 | 8/1981 | Izzi | 426/549 X |
| 4,367,243 | 1/1983 | Brummett et al. | 426/505 X |
| 4,463,020 | 7/1984 | Ottenberg | 426/549 X |
| 4,643,900 | 2/1987 | Porter | 426/549 X |

FOREIGN PATENT DOCUMENTS 0279270  3/1952  Switzerland ......................... 99/432

OTHER PUBLICATIONS

Pizza Today, by Jonathan Porter; Sep. 1989 pp. 3 and 46-56.

*Primary Examiner*—Philip R. Coe
*Assistant Examiner*—James F. Hook
*Attorney, Agent, or Firm*—Price, Henevelod, Cooper, Dewitt & Litton

[57] ABSTRACT

A pizza crust cooking utensil for use with a pizza crust batter to partially precook a pizza crust. The use of the utensil provides a more uniformly producible, less porous and more stable pizza crust which has better handling characteristics for home or commercial cooking, especially for cooking in a conveyor-type toaster or oven. The utensil includes two cooking plates which align to form a hollow cooking chamber in which the crust is formed as the batter is cooked. The invention is adaptable for use in a cooking appliance or a variety of ovens and has a transition region from the crust center to the rim to assure a well-defined rim and to stiffen the crust toward the rim for better handling. Channels extending between the center region to the rim area of the utensil enhance batter flow. Preferably, the generally planar center of the lower cooking plate is thicker to assure more complete, uniform and thorough cooking of the top surface of the crust.

6 Claims, 2 Drawing Sheets

PIZZA CRUST COOKING UTENSIL

This is a continuation of application Ser. No. 07/530,608, filed May 30, 1990, now abandoned.

BACKGROUND OF THE INVENTION

The present invention relates to the forming and partial cooking of a pizza crust.

It is presently known to form a pizza crust by hand or to use a machine to shape dough for a pizza crust. One method using a machine involves spinning a portioned amount of dough until the dough is sufficiently stretched into a traditional circular shape and desired thickness by centrifugal force. In another method, a portioned amount of dough is passed through rollers to roll out the dough to the desired shape and thickness. Yet another method uses a press to press out the dough to the desired shape and thickness, somewhat analogous to rolling. However, these methods often result in a pizza crust which, after pizza toppings have been applied, has one or more of the following deficiencies: the lack of uniform shape or thickness; an uneven and poorly defined rim; an excessively wide rim; a tough texture; a pale, unappetizing color; bland or no flavor; a soggy and limp body because the moisture of the pizza toppings seeped through the unbaked dough; and a raw, moisture-laden center as a result of too high cooking temperature, too quickly cooked.

With today's emphasis on product quality and utility of time, society has an interest in having a quickly prepared, high quality pizza crust Customer satisfaction, in home or commercially prepared products, is based upon meeting customer expectations, which in turn calls for uniformity in the product. Further, customer satisfaction includes the perception of value, which is dependent upon the costs going into the product, not only the cost of ingredients but the cost in terms of time spent to produce the product, the degree of skill required to obtain the desired level of quality in the product, and preparation and clean-up time in making the product. A further element of the customer satisfaction equation involves the tolerance of the product to handling during preparation and presentation such that the product is not damaged and an attractive, appetizing product is delivered for consumption.

SUMMARY OF THE INVENTION

The present invention effectively addresses the above enumerated deficiencies and problems The pizza crust cooking utensil of the present invention includes two members which align to form a cooking chamber for repeatedly forming a precooked pizza crust in a specific shape. The invention is specifically adapted for use with a pourable batter which is shaped, molded and formed into a stable, partially baked crust when cooked in the utensil.

In one aspect of the invention, the utensil is used with a cooking appliance by removably fastening each member to the appliance.

In another aspect of the invention, the two members are shaped to form a uniform rim about the perimeter of the pizza crust.

In another aspect of the invention, one member is shaped to form the top portion of the pizza crust and is thicker than the other member, which is shaped to form the bottom portion of the pizza crust, so that the top of the pizza crust is more thoroughly baked and the crust is less susceptible to becoming soggy from the subsequent application of toppings. This also accommodates the further baking of the bottom of the crust as the fully assembled pizza is heated after pizza toppings have been applied.

In another aspect of the invention, a pizza crust batter is used with the invention for consistent, good results.

In a preferred form, the utensil includes a sloping transition region between a central planar area and a peripheral rim area so as to enhance the flow of batter into the rim area and to enhance the handling stability of the resulting crust during preparation, cooking and serving. Further, sloping channels between the central planar area and the rim area can be included in the transition region to encourage batter flow to the rim and further enhance crust handling stability.

These and other objects, advantages and features of the present invention will become apparent upon review of the following specification in conjunction with the drawings.

DESCRIPTION OF THE PREFERRED EMBODIMENT

Figure 1:
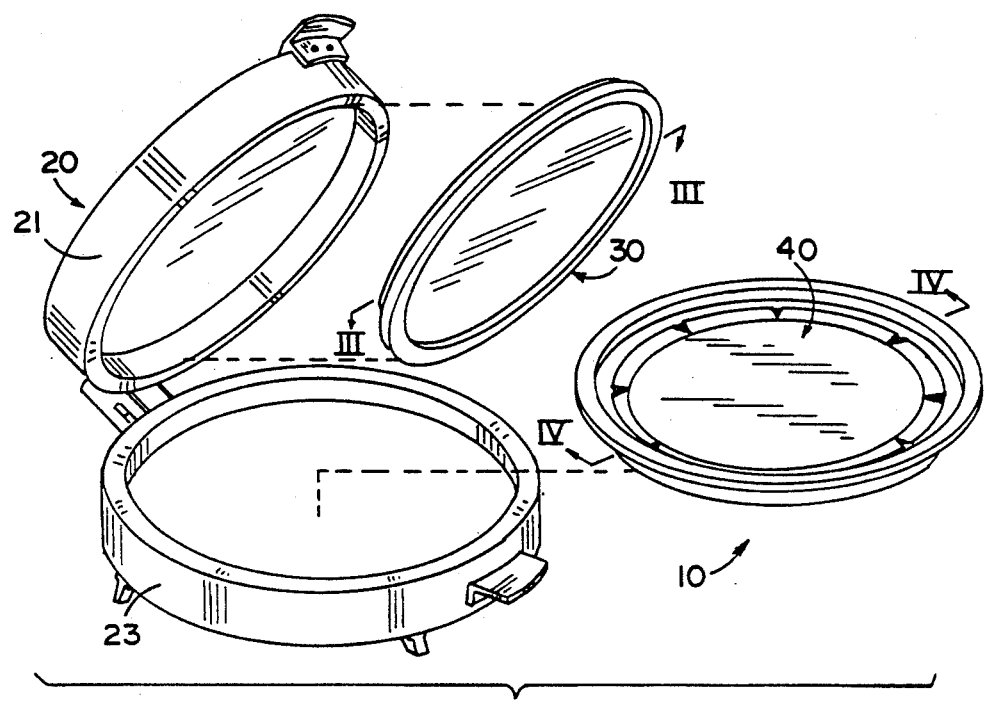
FIG. 1 is a perspective view showing the placement of the utensil of the invention in a cooking appliance.
Figure 2:
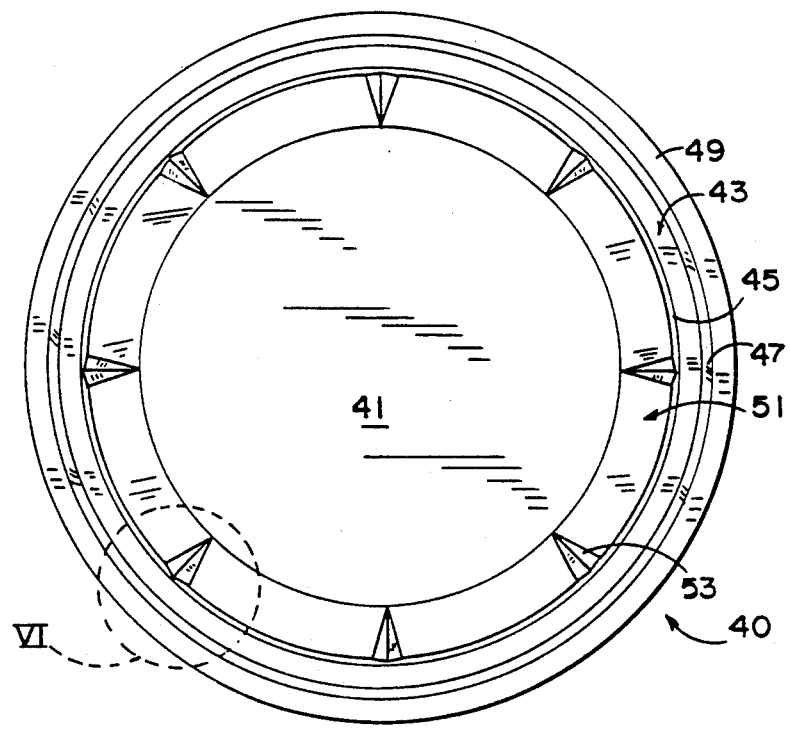
FIG. 2 is a plan view of the lower plate of the invention.

Referring to the drawings in more detail, the pizza crust cooking utensil 10 of the present invention is preferably used in a cooking appliance 20, such as a Toastmaster 252W waffle iron from which the waffle pattern plates have been removed, having an upper housing 21 and a lower housing 23, as shown in FIG. 1. Alternately, utensil 10 may be heated in an oven. Utensil 10 is used to precook a pizza crust 60 (FIG. 5) from a specially prepared batter. While utensil 10 is shown in the drawings in the generally recognized round pizza configuration, this is not a limitation on the invention, which can easily be made in square, rectangular or triangular configurations, for example, and in large sizes and small, individual serving sizes. Utensil 10 has cooperating upper plate 30 for forming the bottom portion 61 of crust 60 and a lower plate 40 for forming the top portion 63 and rim 65 of the crust (see FIG. 5). Plates 30 and 40 align in use in appliance 20 to form a substantially closed, hollow cooking chamber for cooking and forming crust 60 from a batter.

Figure 3:
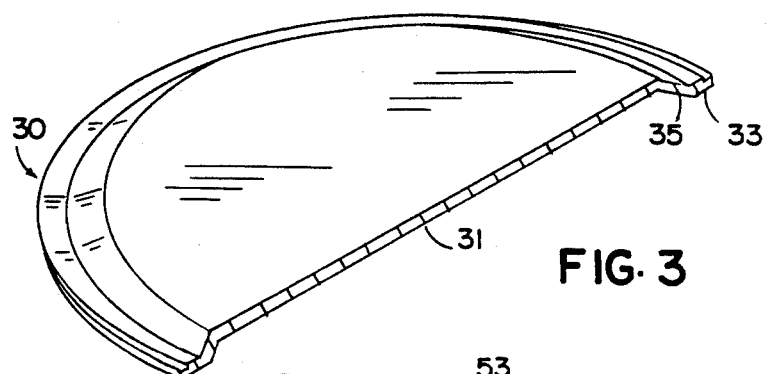
FIG. 3 is a perspective view of the top plate of the invention with a sectional cutaway at plane III—III as indicated in FIG. 1.
Figure 4:
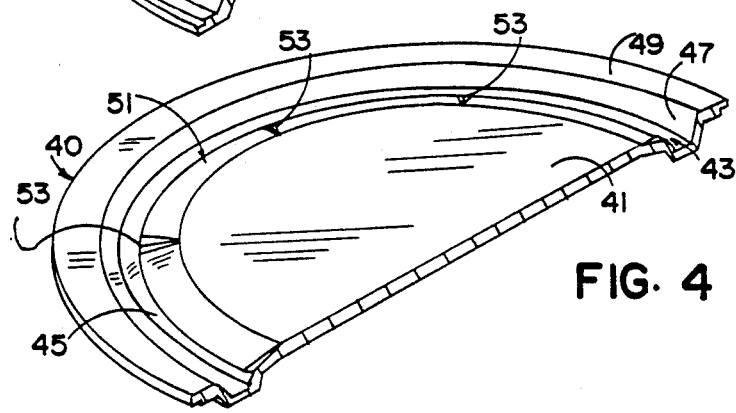
FIG. 4 is a perspective view of the lower plate of the invention with a sectional cutaway at plane IV—IV as indicated in FIG. 1.
Figure 5:
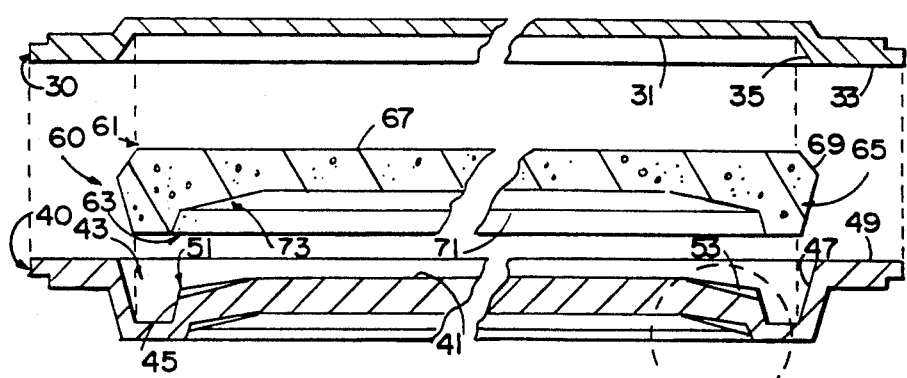
FIG. 5 is an exploded, sectional view of the invention, combining sectional views from FIGS. 3 and 4, showing a pizza crust as formed by the utensil of the invention.
Figures 6, 7:
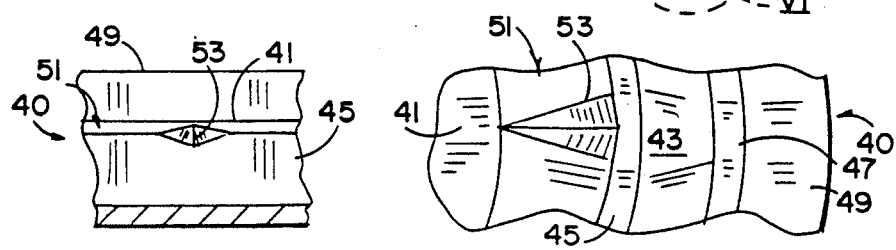
FIG. 6 is a detailed elevation view of detail VI of FIGS. 2 and 5.
FIG. 7 is a detailed plan view of detail VI of FIGS. 2 and 5.

As shown in FIGS. 3 and 5, plate 30 has a planar, recessed center portion 31 with a sloping sidewall 35 and a flange portion 33 which circumscribes the perimeter of the plate. Recess 31 defines the bottom surface 67 of crust 60, made in utensil 10. The sloping sidewall 35 enhances the release of the crust from plate 30 and forms a bevel 69 at the lower outer edge of rim 65, making crust 60 easier to handle. The flange 33 allows plate 30 to couple with and attach to upper housing 21 of appliance 20. Preferably, plate 30 is cast aluminum and center portion 31 has a uniform thickness of about ⅛-inch. Further, in the preferred embodiment, at least the cooking surfaces of plate 30 are coated with a non-stick finish to prevent crust 60 from sticking. TEFLON TM coatings and other high-temperature-resistant materials well known in the art may be satisfactorily utilized.

Lower plate 40 also has a planar center portion 41 for defining the top surface 71 of crust 60. A trough 43 circumscribes the perimeter of center portion 41. Trough 43 has a sloping sidewall 45 which extends upwardly to center portion 41, and a sidewall 47 which extends upwardly to a flange portion 49 which circumscribes the perimeter of plate 40. Center portion 41 is recessed below the level of flange 49 but is spaced above and is thus upstanding with respect to the bottom of trough 43. The upper portion 75 of rim 65 is formed in trough 43. A sloping transition region 51 extends between center portion 41 and sidewall 45, sloping downwardly, preferably at 15°, from center portion 41 to trough 43. Region 51 prefereably extends from 1-inch inside of flange 49 to sidewall 45 Region 51 enhances the flow of batter into trough 43 and thickens the crust to strengthen the crust near the rim at 73. A series of equally-spaced channels 53 is positioned in region 51 and extends from center portion 41 to trough 43 to assure even distribution of batter into trough 43. Preferably, channels 53 are V-shaped in section, although other shapes such as rounded or U-shaped may also be used, for example, and slope downwardly to trough 43 more steeply than region 51. Flange 49 allows plate 40 to couple with and attach to lower housing 23 of appliance 20.

Preferably, plate 40 is cast aluminum and center portion 41 has a uniform thickness of about ¼-inch, in essence, generally twice that of portion 31 of upper plate 30. This allows center portion 41 to retain more heat to more completely cook the upper surface 63 of crust 60 such that it is resistant to becoming soggy when toppings such as sauce, cheese, meat and the like are added and the resulting pizza is thoroughly cooked for consumption. Further, in the preferred embodiment, at least the cooking surfaces of plate 40 are coated With a nonstick finish to prevent crust 60 from sticking Teflon coatings and other high-temperature-resistant materials well known in the art may be satisfactorily utilized.

In use, upper plate 30 is conventionally installed in upper housing 21 and lower plate 40 is conventionally installed in lower housing 23 in a manner similar to the installation of waffle pattern plates in cooking appliance 20. While conventional batter recipes are of a quick bread (such as pancakes and waffles) or cake nature and result in a cooked product which is porous and quickly absorbs liquid from a topping, utensil 10 is used with a batter containing yeast and a thickening agent ingredient to yield a more bread-like product which is less susceptible to becoming soggy from the application of toppings, especially in light of the more thoroughly cooked upper surface 63 of crust 60. Further, while a conventional pizza dough mix can be modified to make a batter for satisfactory use with utensil 10, the utensil is preferably used with an original and convenient recipe, using readily available ingredients, which gives excellent results as disclosed in the following steps, using typical kitchen measuring methods and accuracy:

Step 1—Batter Mix

Mix 6 cups all-purpose flour, a ¼-ounce package of fast-acting dry yeast to raise the batter and to give the resulting crust a bread-from-dough characteristic, unlike a quick bread; ¼-cup nonfat dry milk to enhance the color and texture of the resulting pizza crust; and 1 tablespoon salt for flavor and to control the growth of the yeast in a large mixing bowl. To this mixture add 4¾ cups very warm (125°-130° F.) water; 1 tablespoon sweetened clear corn syrup as a thickening agent and to produce a less porous crust, that corn syrup being sweetened with a sugar, not an artificial sweetener, for flavoring and to activate the yeast and for an appetizing golden brown color; and 4 teaspoons cooking oil for flavor, for color, to enhance texture and to enhance the quick release and removal of the resulting crust, stirring thoroughly until smooth. Cover the bowl and let batter rest for 10 minutes in a warm (125° F.) oven. Again stir the batter until smooth and let batter stand approximately 60 minutes at room temperature. Alternately, liquid potato starch could be substituted as the thickening agent but would also require sweetening with a sugar.

Step 2

While batter stands, preheat utensil 10 to 350° F. in appliance 20.

Step 3

Again stir batter until smooth and pour 5 ounces of batter on center of lower plate 40. Close upper housing 21 onto lower housing 23, bringing upper plate 30 into alignment over lower plate 40 and let bake for 8 minutes.

Step 4

Remove pizza crust 60 and let cool on cooling rack for 12 minutes. The crust may now be wrapped in a plastic bag and refrigerated for later use or may be topped with appropriate pizza toppings and baked on the middle rack of a 550° F. oven on a perforated or screened pan for 2½ minutes before serving.

The above description is considered that of the preferred embodiment only. Modifications of the invention will occur to those who make or use the invention. Therefore, it is understood that the embodiment shown in the drawings and described above is merely for illustrative purposes and is not intended to limit the scope of the invention, which is defined by the following claims as interpreted according to the principles of patent law including the doctrine of equivalents.

The embodiments of the invention in which an exclusive property or privilege is claimed are defined as follows:

1. A utensil particularly adapted for preparing a pizza crust from a pourable batter, said utensil comprising:
   a lower member being adapted to form a top surface of the crust, said lower member including: a generally planar lower center portion which faces upward; a perimeter trough for forming a rim of the crust; and a sloping transition region extending downward and outward from said lower center portion to said perimeter trough to enhance the flow of the batter into said perimeter trough from said lower center portion; and a corresponding upper member being adapted to overlay said lower member and forming therebetween a chamber within which a batter is cooked, said upper member including a generally planar upper center portion which faces downward for forming a bottom surface of the crust, said upper center portion having a thickness and said lower center portion having a thickness greater than the thickness of said upper center portion so that said lower center portion has greater heat retention than said upper center portion so that the top surface of the crust is cooked more thoroughly than the bottom surface of the crust.

2. The utensil defined in claim 1 wherein said perimeter trough has an outer perimeter wall, opposite said perimeter trough from said lower center portion and said sloping transition region extends to said perimeter trough from a position at least about one inch inward from said outer perimeter wall, toward said lower center portion.

3. The utensil defined in claim 2 wherein said sloping transition region includes a series of channels extending from said lower center portion to said trough for even distribution of a batter flowing into said trough.

4. The utensil defined in claim 3 wherein said lower center portion is generally in a reference plane and wherein said sloping transition region intersects said perimeter trough at about fifteen degrees downward angle relative to said reference plane.

5. A utensil particularly adapted for preparing a pizza crust from a pourable batter, said utensil comprising:
a lower member being adapted to form a top surface of the crust, said lower member including: a generally planar lower center portion which faces upward; a perimeter trough for forming a rim of the crust; and a sloping transition region extending downward and outward from said lower center portion to said perimeter trough to enhance the flow of the batter into said perimeter trough from said lower center portion; said sloping transition region including a series of channels extending from said lower center portion to said trough; said perimeter trough having an outer perimeter wall, opposite said perimeter trough from said lower center portion; said sloping transition region extending to said perimeter trough from a position at least about one inch inward, toward said lower center portion, from said outer perimeter wall; and
a corresponding upper member being adapted to overlay said lower member and forming therebetween a chamber within which a batter is cooked, said upper member including a generally planar upper center portion which faces downward for forming a bottom surface of the crust, said upper center portion having a thickness and said lower center portion having a thickness greater than the thickness of said upper center portion so that said lower center portion has greater heat retention than said upper center portion.

6. A utensil particularly adapted for preparing a pizza crust from a pourable batter, said utensil comprising:
a lower member being adapted to form a top surface of the crust, said lower member including: a generally planar lower center portion which faces upward; a perimeter trough for forming a rim of the crust; and a sloping transition region extending downward and outward from said lower center portion to said perimeter trough to enhance the flow of the batter into said perimeter trough from said lower center portion;
first heating means for heating said lower member;
an upper member corresponding to said lower member and being adapted to overlay said lower member, forming therebetween a chamber within which a batter is cooked, said upper member including a generally planar upper center portion which faces downward for forming a bottom surface of the crust, said upper center portion having a thickness and said lower center portion having a thickness greater than the thickness of said upper center portion so that said lower center portion has greater heat retention that said upper center portion; and
second heating means for heating said upper member, said first heating means and lower member and said second heating means and upper member being adapted to more thoroughly cook the top surface of the crust than the bottom surface of the crust.

* * * * *

UNITED STATES PATENT AND TRADEMARK OFFICE
CERTIFICATE OF CORRECTION

PATENT NO. : 5,154,115

DATED : October 13, 1992

INVENTOR(S) : Leonard Kian

It is certified that error appears in the above-identified patent and that said Letters Patent is hereby corrected as shown below:

Column 1, line 32:
    After "crust" insert --,--.

Column 1, line 50:
    After "problems" insert --,--.

Column 3, line 27:
    After "sidewall 45" insert --,--.

Column 3, line 48:
    "With" should be --with--.

Signed and Sealed this

Twenty-first Day of December, 1993

Attest:

BRUCE LEHMAN

Attesting Officer

Commissioner of Patents and Trademarks